United States Patent [19]
Hanscombe et al.

[11] Patent Number: 5,286,109
[45] Date of Patent: Feb. 15, 1994

[54] DISTRIBUTED TEMPERATURE SENSOR

[75] Inventors: Paul A. Hanscombe, Uxbridge; Paul N. Richards, Basingstoke, both of England

[73] Assignee: Schlumberger Industries Limited, Farnborough, England

[21] Appl. No.: 17,951

[22] Filed: Feb. 16, 1993

Related U.S. Application Data

[63] Continuation of Ser. No. 712,769, Jun. 10, 1991, abandoned.

[30] Foreign Application Priority Data

Jun. 28, 1990 [GB] United Kingdom ............... 9014370

[51] Int. Cl.⁵ ............................................ G01K 11/22
[52] U.S. Cl. .................................. 374/119; 333/142; 367/87
[58] Field of Search ..................... 374/117, 118, 119; 310/26, 313 D, 322; 333/142, 143, 145; 367/13, 87

[56] References Cited

U.S. PATENT DOCUMENTS

| | | | |
|---|---|---|---|
| 3,514,747 | 5/1970 | Lynnworth et al. | 374/119 X |
| 3,540,265 | 11/1970 | Lynnworth et al. | 374/119 X |
| 3,931,593 | 1/1976 | Bongianni | 310/313 D X |
| 4,762,425 | 8/1988 | Shakkottai et al. | 374/117 |
| 5,022,014 | 6/1991 | Kulczyk et al. | 374/119 X |
| 5,044,769 | 9/1991 | Kulczyk et al. | 374/119 |

FOREIGN PATENT DOCUMENTS 1419517 12/1975 United Kingdom ............... 374/119

*Primary Examiner*—Thomas B. Will
*Assistant Examiner*—G. Bradley Bennett
*Attorney, Agent, or Firm*—Sanford J. Asman

[57] ABSTRACT

A distributed temperature sensor comprises an elongate ultrasonic waveguide having a number of zones along its length, each zone having a grating formed on it. This is typically achieved by incorporating uniformly spaced notches or bands (or collars) throughout the zone. The grating spacing in each zone is different, so that each grating reflects a characteristic frequency. This frequency varies as the temperature of the zone varies, so if wide-band ultrasonic pulses are launched into the waveguide, the temperature of each zone can be determined from the reflected frequencies.

7 Claims, 2 Drawing Sheets

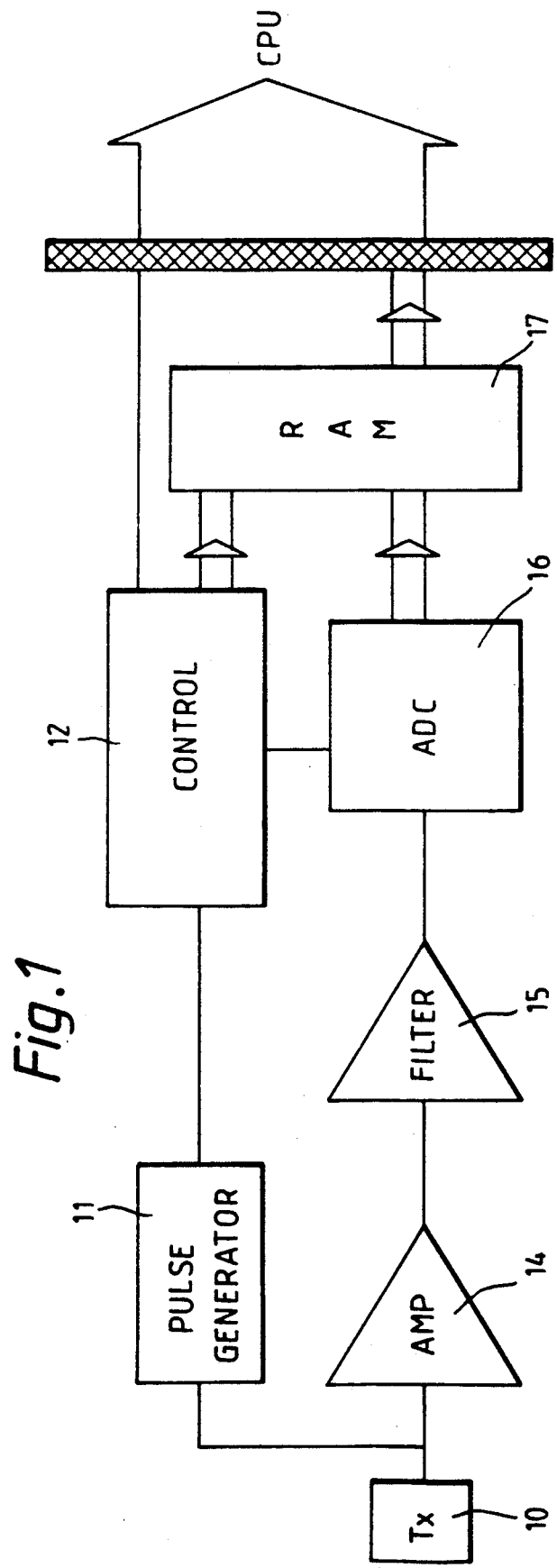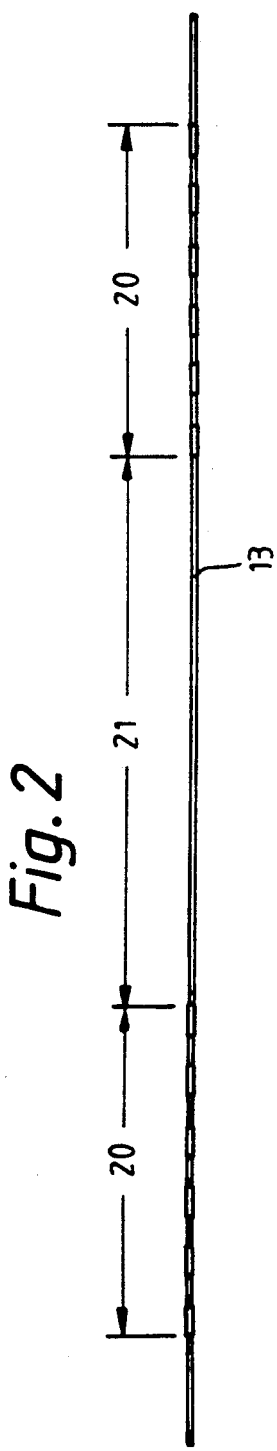

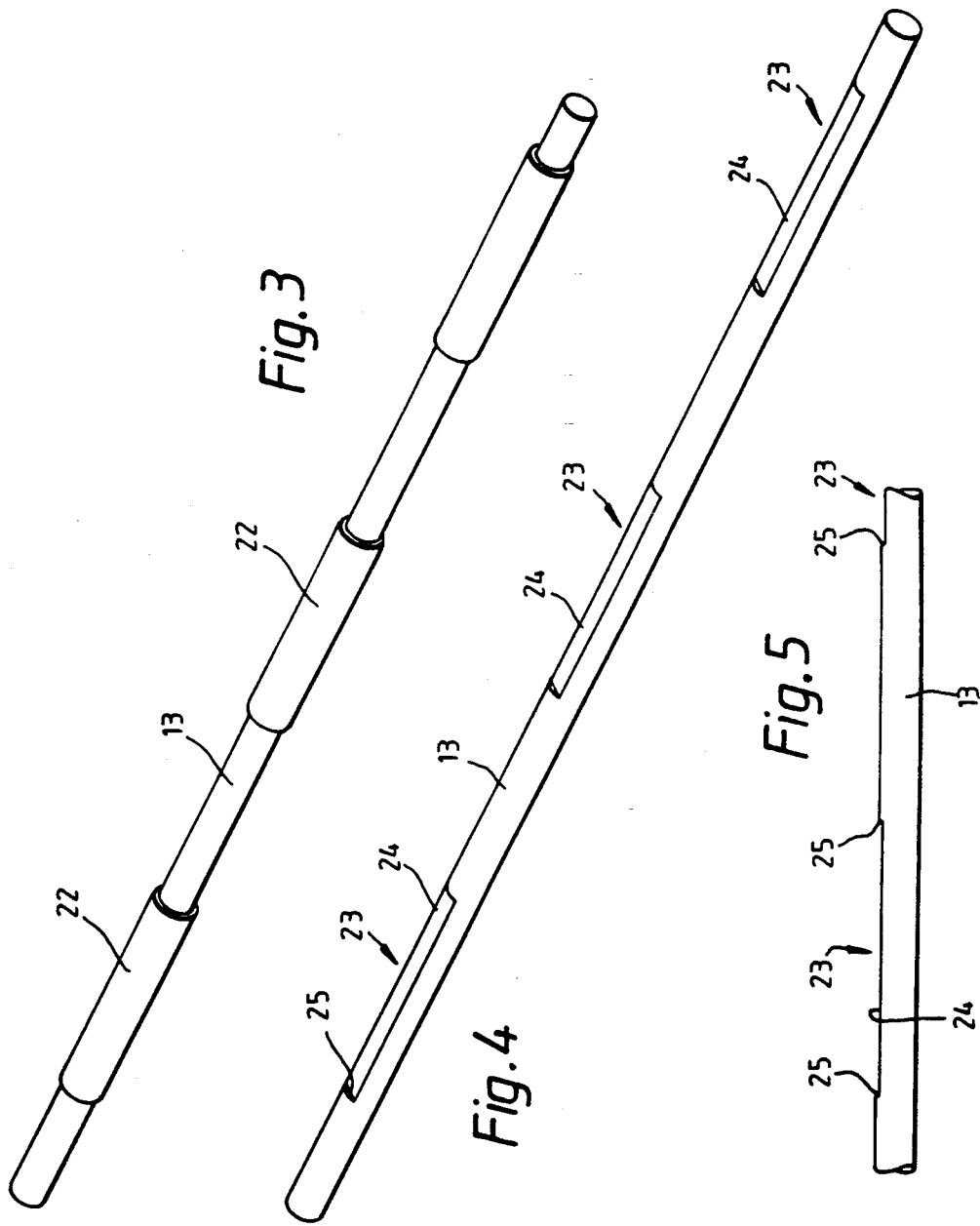

DISTRIBUTED TEMPERATURE SENSOR

This application is a continuation of application Ser. No. 07/712,769, filed on Jun. 10, 1991, now abandoned, entitled DISTRIBUTED TEMPERATURE SENSOR.

The present invention relates to a distributed temperature sensor to meet the need for detection and location of hot spots occurring anywhere within a large area, for example for detecting overheating which may result from or lead to a fire in a building, an aircraft or a major piece of equipment.

Conventionally individual sensor are placed at a large number of positions and connected to the central surveillance station. It is also known for individual temperature measurements to be made by measuring the time of travel of ultrasonic waves between two points along a solid rod or bar. Discontinuities in the cross-section of the rod or bar from reflectors for the ultrasonic waves and the time difference between echoes from two reflectors can be measured. Since the velocity of the waves in the medium is temperature dependent this provides a measure of the temperature in the region of the reflectors.

In accordance with the invention there is provided a distributed temperature sensor comprising an elongate ultrasonic waveguide, said waveguide having at least one zone formed as a grating to reflect the ultrasonic waves at a frequency determined by the grating dimensions and temperature, means for supplying a wide range of ultrasonic frequencies to the waveguide and means for detecting and analysing the frequencies reflected by the grating to provide a measure of the temperature of the zone.

The means for supply ultrasonic frequencies may be a pulse generator, preferably comprising an electric pulse generator coupled to a magneto-strictive element to generate the ultrasonic waves.

The gratings may be formed by machining flats at intervals along the length of a sensor wire forming the waveguide or applying collars to the sensor wire by a plating, spraying or other deposition process. In each case the grating is preferably a regular grating with a mark/space ratio of one. The wavelength of the reflected waves will be four times the length of each mark or space. The positions of the grating zones along the sensor wire can be chosen as required and their lengths can also be chosen arbitrarily. Each will have a grating which reflects a characteristic narrow band of frequencies so that the signals from the various grating zones do not interfere with one another and are easily distinguished.

As the temperature of the sensor wire varies in any particular zone, the velocity of the waves within the wire changes and hence the reflected wavelength and frequency determined by the grating dimensions will change. The change in the measured frequency therefore represents the changing temperature of a particular zone of the sensor. If the whole of a grating zone is heated uniformly the peak reflected frequency will be shifted by an amount representing the average temperature change. If only part is heated the frequency spectrum, will be broadened. In this case an average temperature change can again be determined but it is also possible by analysis of the reflected frequencies to detect hot spots in the zone. This can be done by spectral analysis or by using timing windows to examine parts of the spectrum. The latter procedure would also enable the position and width of a hot spot to be determined.

In a further development the whole length of the sensor wire is formed as a reflecting grating with a continuously varying spacing between the reflectors. In this case different frequencies in the reflected waves are characteristic of different parts of the sensor wire and they can again be analysed to give a measure of the temperature of different parts of the wire. A fast Fourier transform (FFT) of the received signal will enable the phase and amplitude of each frequency to be determined and from this the group delay can be computed. The group delay as a function of frequency represents the variation of temperature with distance along the sensor and thus provides a measure of the temperature at any point along the sensor wire.

The invention will now be described in more detail with the aid of an example illustrated in the accompanying drawings, in which:

FIG. 1 is a block circuit diagram of the pulse supply and measurement devices for a sensor in accordance with the invention;

FIG. 2 is a diagrammatic view of part of a sensor wire forming part of the sensor of FIG. 1;

FIG. 3 is an enlarged perspective view of one reflector section of the wire of FIG. 2; and FIGS. 4 and 5 are enlarged perspective and side views respectively of an alternative embodiment of reflector section of the sensor wire of FIG. 2.

As shown in FIG. 1 a magneto-strictive transducer 10 is connected to an electrical pulse generator 11 which is triggered by a control unit 12. The transducer 10 transmits a pulse or burst of ultrasonic energy along a wire or rod 13, shown in FIGS. 2 and 3, and detects the echoes returned along the rod 13. The echo signals are amplified by an amplifier 14 and passed by a filter 15 to an analogue-to-digital converter 16 whose output is fed to a RAM 17. The control unit 12 synchronizes the ADC 16 and also feeds signals to the RAM 17. It additionally provides a control input to a CPU which analyses the signals from the RAM 17 and carries out the calculations necessary to establish the temperatures at different parts of the sensor wire 13 and decide whether those represent a dangerous condition.

As seen in FIG. 2 the sensor wire 13 has a number of reflector zones 20 separated by lengths of plan wire 21. The length of each reflector zone and the spacing between zones is chosen as required by cover the areas where overheating is likely to occur. FIG. 3 shows a reflector zone which is formed by a series of barrels or collars 22 deposited on the outer surface of the rod 13. These need only project by 0.005 inch to provide a discontinuity which will reflect the ultrasonic waves. The length of each barrel and the spacing between the barrels is the same and is selected to selectively reflect a narrow band of frequencies out of the spectrum of frequencies in the transmitted pulse. The reflected frequencies will centre on that for which the length of the barrel is a quarter wavelength. Each reflector zone has a different value of the length and spacing of the collars 22 so that it reflects a different frequency. A change in temperature in one of the reflector zones alters the sonic velocity and thus modifies the reflected frequency in a manner which is representative of the temperature change. A shift in the central frequency represents a change in the average temperature of the zone while broadening of the spectrum of the reflected frequencies indicates a hot spot within the zone whose position and width can be determined by analysis of the frequency spectrum.

As an alternative to the bands or collars 22, and as shown in FIGS. 4 and 5, the reflector zones can be provided with a series of notches 23 formed by machining flats 24 into the cylindrical surface of the wire 13. All the flats 24 are on one side of the wire 13 and lie in a common plane perpendicular to a diametral plane of the wire. The depth of each notch 23 as seen in cross-section and measured along the diameter can be as little as 0.005 inch below the periphery of the wire 13. The steps 25 at the ends of the notches 23 provide the reflecting discontinuities.

The material of the sensor wire 13 is chosen to withstand the environment in which it is to be used and should thus have high oxidation resistance. It should be thermally stable and preferably has an approximately linear dependence of acoustic velocity on temperature, though for detecting a specific temperature a material having a step change at or near that temperature could be used. A variety of metals satisfy these requirements such as molybdenum, thoriated tungsten, nickel-plated titanium, stainless steels and other alloys such as iridium/rhenium and tungsten/rhenium and some plastics materials can also be used. One end of the sensor wire is welded to a magneto-strictive rod forming part of the transducer for the generation and detection of the ultrasonic waves.

Typically the sensor wire may be of 0.064 inch diameter and have a series of reflector zones each of 30 inch length, separated by uniform zones which can be of varied length, either greater or less than that of the reflector zones. In each zone the spacing between and the width of notches or barrels is preferably the same throughout the zone but from one zone to another may vary from, for example, 0.175 inch to 0.719 inch, corresponding to frequencies of 283 kHz to 69 kHz.

The detected temperature changes may be used in a variety of ways, for example to trigger alarm or sprinkler systems. One method of analyzing the information obtained is to consider the temperatures of three adjacent sub-zones. If the average temperature Ta of two adjacent sub-zones is related to the temperature Tt of the third sub-zone by the inequality $$Ta > m\, Tt + c$$

where m and c are constants chosen for the particular circumstances, then a fire state is indicated. If the average temperature of the three sub-zones (assumed to be of equal length) given by $\frac{1}{3}(2Ta+Tt)$ is greater than a threshold value an overheat condition is indicated.

The fire state may result from a hot spot at a temperature TH extending over a short length $l$ of the two adjacent sub-zones which have a total length 2L and are otherwise at a relatively cool temperature Tc. In this case the average temperature Ta is given by $$Ta = \frac{Tc(2L - l) + T_H \times l}{2L}$$

Thus Ta is responsive both to an increase in the hot spot temperature relative to that of the surroundings and to an increase in the length affected by the increased temperature and the fire state will be indicated for a very high temperature affecting a small length or for a lower temperature affecting a longer length.

The reflected ultrasonic waves may also be analysed by opening small temporal windows and measuring the reflected waves from say each successive 6" of each grating, or by sliding such a window down the grating, to obtain a temperature profile.

What is claimed is:

1. A distributed temperature sensor comprising an elongated solid ultrasonic waveguide, said waveguide having at least one zone formed as a grating to reflect the ultrasonic waves at a frequency determined by the grating dimensions and temperature, means for supplying a wide range of ultrasonic frequencies to the waveguide and means for detecting and analysing the frequencies reflected by the grating to provide a measure of the temperature of the zone.

2. A temperature sensor as claimed in claim 1 in which the or each zone is formed as a regular grating with a mark/space ratio of one.

3. A temperature sensor as claimed in claim 2 in which each of a number of zones has a different grating repeat length.

4. A temperature sensor as claimed in claim 1 in which a length of the waveguide is formed as a reflecting grating with a continuously varying spacing between the reflector elements.

5. A temperature sensor as claimed in claim 1 in which the or each grating is formed by providing notches at intervals along the length of the waveguide.

6. A temperature sensor as claimed in claim 5 in which the waveguide is of circular cross-section and the notches are formed by machining flats of intervals along the waveguide surface.

7. A temperature sensor as claimed in claim 1 in which the means for supplying ultrasonic energy to the waveguide comprises an electrical pulse generator coupled to a magneto-strictive element.

* * * * *